(12) United States Patent
Motos et al.

(10) Patent No.: US 12,301,276 B2
(45) Date of Patent: May 13, 2025

(54) FREQUENCY-DIVISION MULTIPLEXING

(71) Applicant: Texas Instruments Incorporated, Dallas, TX (US)

(72) Inventors: Tomas Motos, Hamar (NO); Thomas Almholt, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 118 days.

(21) Appl. No.: 17/554,922

(22) Filed: Dec. 17, 2021

(65) Prior Publication Data
US 2022/0255580 A1  Aug. 11, 2022

Related U.S. Application Data

(60) Provisional application No. 63/146,375, filed on Feb. 5, 2021.

(51) Int. Cl.
*H04B 1/69* (2011.01)
*H04L 27/10* (2006.01)
*H04L 5/00* (2006.01)

(52) U.S. Cl.
CPC ............. *H04B 1/69* (2013.01); *H04L 27/103* (2013.01); *H04B 2001/6912* (2013.01); *H04L 5/0007* (2013.01)

(58) Field of Classification Search
CPC . H04B 1/69; H04B 2001/6912; H04L 27/103; H04L 5/0007
See application file for complete search history.

(56) References Cited

U.S. PATENT DOCUMENTS

| | | |
|---|---|---|
| 8,406,275 B2 | 3/2013 | Sforza |
| 9,001,948 B2 | 4/2015 | Ramakrishnan |
| 9,252,834 B2 | 2/2016 | Seller et al. |
| 9,525,454 B2 | 12/2016 | Seller |
| 9,577,702 B2 | 2/2017 | Seller |
| 9,647,718 B2 | 5/2017 | Seller |
| 9,681,256 B2 | 6/2017 | Vos et al. |
| 9,794,095 B2 | 10/2017 | Sornin et al. |
| 9,800,288 B2 | 10/2017 | Seller et al. |
| 9,831,909 B2 | 11/2017 | Schmidl et al. |
| 9,935,681 B2 | 4/2018 | Lingam |
| 10,140,114 B2 | 11/2018 | Nogueira-Nine |
| 10,142,255 B1 | 11/2018 | Pachon et al. |
| 10,305,535 B2 | 5/2019 | Seller et al. |

(Continued)

OTHER PUBLICATIONS

"IEEE Standard for Low-Rate Wireless Networks," Sections 20-26, May 6, 2020. IEEE Computer Society, New York City. 155 pages.

*Primary Examiner* — Freshteh N Aghdam
(74) *Attorney, Agent, or Firm* — Michelle F. Murray; Frank D. Cimino

(57) ABSTRACT

A method is provided. In some examples, the method includes generating, by processing circuitry, a spread of chips representing an input bit. In addition, the method includes converting, by the processing circuitry, the spread of chips to a plurality of symbols comprising a pair of symbols. The method also includes mapping, by the processing circuitry, the pair of symbols to a single carrier signal and generating, by the processing circuitry, a radio-frequency (RF) signal based on the single carrier signal. The method further includes transmitting, by the processing circuitry via an antenna, the RF signal.

20 Claims, 4 Drawing Sheets

(56) References Cited

U.S. PATENT DOCUMENTS

| | | |
|---|---|---|
| 10,321,397 B2 | 6/2019 | Gandhi et al. |
| 10,425,362 B2 | 9/2019 | Champion et al. |
| 10,499,306 B2 | 12/2019 | Livanos |
| 10,516,421 B1 | 12/2019 | Bonicatto et al. |
| 10,530,628 B1 | 1/2020 | Yoo et al. |
| 10,680,861 B2 | 6/2020 | Schmidl |
| 10,746,845 B2 | 8/2020 | Seller |
| 10,783,418 B2 | 9/2020 | Teggatz et al. |
| 10,812,130 B2 | 10/2020 | Talla et al. |
| 10,855,329 B2 | 12/2020 | Seller et al. |
| 10,871,541 B2 | 12/2020 | Peng |
| 10,917,135 B2 | 2/2021 | Ning et al. |
| 10,937,263 B2 | 3/2021 | Tout et al. |
| 10,962,632 B2 | 3/2021 | Moe et al. |
| 10,965,504 B2 | 3/2021 | Paquelet et al. |
| 11,043,471 B2 | 6/2021 | Sato et al. |
| 11,070,467 B1 | 7/2021 | Shukla |
| 11,101,843 B1 | 8/2021 | Wild |
| 11,122,637 B1 | 9/2021 | Habibullah et al. |
| 11,153,181 B1 | 10/2021 | Tsai et al. |
| 11,229,028 B2 | 1/2022 | Vos et al. |
| 11,245,434 B2 | 2/2022 | Seller |
| 11,258,169 B1 | 2/2022 | Channabasappa et al. |
| 11,310,085 B2 | 4/2022 | Seller et al. |
| 11,349,707 B1 | 5/2022 | Gerstberger et al. |
| 11,350,339 B1 | 5/2022 | Wong et al. |
| 11,368,184 B2 | 6/2022 | Seller et al. |
| 11,456,852 B2 | 9/2022 | Seller et al. |
| 11,579,232 B1 | 2/2023 | Duksta et al. |
| 11,605,254 B1 | 3/2023 | Musabeyoglu et al. |
| 11,652,679 B2 | 5/2023 | Sahin et al. |
| 11,706,635 B2 | 7/2023 | Labadie et al. |
| 11,811,442 B2 | 11/2023 | de Ruijter |
| 11,838,751 B2 | 12/2023 | Knapp et al. |
| 2005/0102600 A1* | 5/2005 | Anandakumar .. H03M 13/3905 714/755 |
| 2013/0010703 A1* | 1/2013 | Myung .................... H04J 11/00 370/329 |
| 2014/0365848 A1* | 12/2014 | Roh ...................... H04L 1/0041 714/784 |
| 2017/0061131 A1 | 3/2017 | Santos et al. |
| 2018/0198570 A1* | 7/2018 | Astely .................. H04L 1/1812 |
| 2019/0141741 A1* | 5/2019 | Sahlin .................. H04L 1/0005 |
| 2019/0222457 A1* | 7/2019 | Wei ...................... H04L 27/2607 |
| 2020/0259667 A1 | 8/2020 | Garnier et al. |
| 2020/0287726 A1 | 9/2020 | Garnier et al. |
| 2020/0288361 A1 | 9/2020 | Okada et al. |
| 2020/0396750 A1 | 12/2020 | Hwang et al. |
| 2020/0404458 A1 | 12/2020 | Thubert et al. |
| 2021/0058478 A1 | 2/2021 | Thubert et al. |
| 2021/0111750 A1 | 4/2021 | Nguyen et al. |
| 2021/0184869 A1 | 6/2021 | Trere |
| 2021/0212015 A1 | 7/2021 | Salt et al. |
| 2021/0255333 A1 | 8/2021 | Sornin et al. |
| 2021/0405146 A1 | 12/2021 | Avitzour |
| 2022/0166537 A1 | 5/2022 | Maallem et al. |
| 2022/0187443 A1 | 6/2022 | Seller et al. |
| 2022/0264681 A1 | 8/2022 | Labadie et al. |

\* cited by examiner

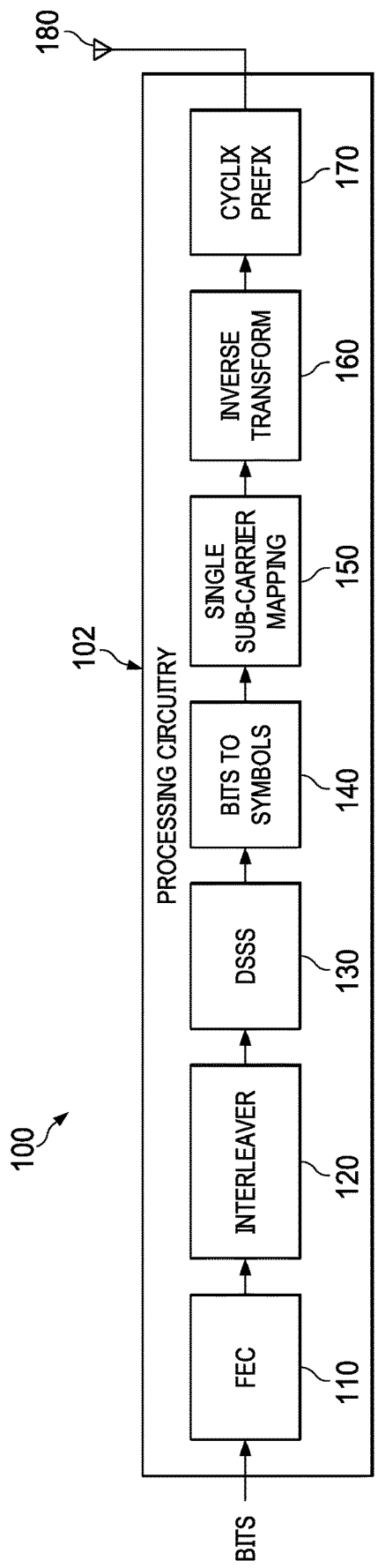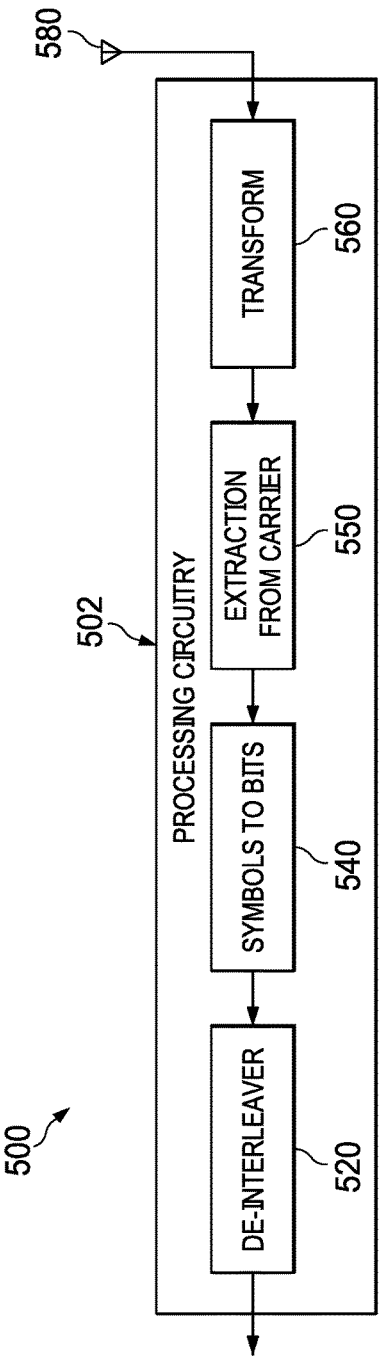
FIG. 1
FIG. 5

| DSSS = 2 | 1 | 0 |
|---|---|---|
| EVEN SPREAD | 0 0 | 0 1 |
| ODD SPREAD | 1 1 | 1 0 |

210

| DSSS = 4 | 1 | 0 |
|---|---|---|
| EVEN SPREAD | 0 0 1 1 | 0 1 1 0 |
| ODD SPREAD | 1 1 0 0 | 1 0 0 1 |

220

| DSSS = 8 | 1 | 0 |
|---|---|---|
| EVEN SPREAD | 0 0 1 1 0 0 1 1 | 0 1 1 0 0 1 1 0 |
| ODD SPREAD | 1 1 0 0 1 1 0 0 | 1 0 0 1 1 0 0 1 |

230

| DSSS = 12 | 1 | 0 |
|---|---|---|
| EVEN SPREAD | 0 0 1 1 0 0 1 1 1 1 0 0 | 0 1 1 0 0 1 1 0 1 0 0 1 |
| ODD SPREAD | 1 1 0 0 1 1 0 0 0 0 1 1 | 1 0 0 1 1 0 0 1 0 1 1 0 |

FREQUENCY-DIVISION MULTIPLEXING

This application claims the benefit of U.S. Provisional Patent Application No. 63/146,375, filed Feb. 5, 2021, the entire content being incorporated herein by reference.

BACKGROUND

In frequency-division multiplexing (FDM), a transmitter can encode data in multiple frequency bands and transmit a radio-frequency (RF) signal that combines the signals from those frequency bands. The RF signal is a combination of multiple sub-carrier signals, each of which encodes information. Because unique information can be encoded in each frequency band, an FDM system typically has a higher data throughput relative to other systems that use only one carrier frequency.

In an orthogonal FDM (OFDM) system, each frequency band is orthogonal to the adjacent frequency bands. In other words, a center frequency of a first frequency band aligns with the null frequency of each adjacent frequency band. The orthogonality of the frequency bands results in reduced interference across the carrier signals. In addition, the orthogonality allows for an OFDM receiver to more easily extract information from each frequency band of the combined RF signal.

SUMMARY

In some examples, a method includes generating, by processing circuitry, a spread of chips representing an input bit. In addition, the method includes converting, by the processing circuitry, the spread of chips to a plurality of symbols comprising a pair of symbols. The method also includes mapping, by the processing circuitry, the pair of symbols to a single carrier signal and generating, by the processing circuitry, a radio-frequency (RF) signal based on the single carrier signal. The method further includes transmitting, by the processing circuitry via an antenna, the RF signal.

In further examples, a computing system includes processing circuitry and a non-transitory computer-readable medium coupled to the processing circuitry and storing instructions that, when executed by the processing circuitry, cause the processing circuitry to generate a spread of chips representing an input bit. In addition, the non-transitory computer-readable medium stores instructions that cause the processing circuitry to convert the spread of chips to a plurality of symbols comprising a pair of symbols and map the pair of symbols to a single carrier signal. The non-transitory computer-readable medium also stores instructions that cause the processing circuitry to generate a radio-frequency (RF) signal based on the single carrier signal including the mapped pair of symbols and transmit the RF signal via an antenna.

In yet further examples, a system includes an antenna and processing circuitry configured to generate a spread of chips representing an input bit. In addition, the processing circuitry is configured to convert the spread of chips to a plurality of symbols comprising a pair of symbols and map the pair of symbols to a single carrier signal. The processing circuitry is also configured to generate a radio-frequency (RF) signal based on the single carrier signal including the mapped pair of symbols. The processing circuitry is further configured to transmit the RF signal via the antenna.

BRIEF DESCRIPTION OF THE DRAWINGS

Features of the present invention may be understood from the following detailed description and the accompanying drawings. In that regard:

FIG. 1 is a conceptual block diagram of a transmitter according to some aspects of the present disclosure.

FIG. 2 shows four tables having example conversions from bits to spreads of chips using direct sequence spread spectrum according to some aspects of the present disclosure.

FIG. 5 is a conceptual block diagram of a receiver according to some aspects of the present disclosure.

DETAILED DESCRIPTION

Figure 3:
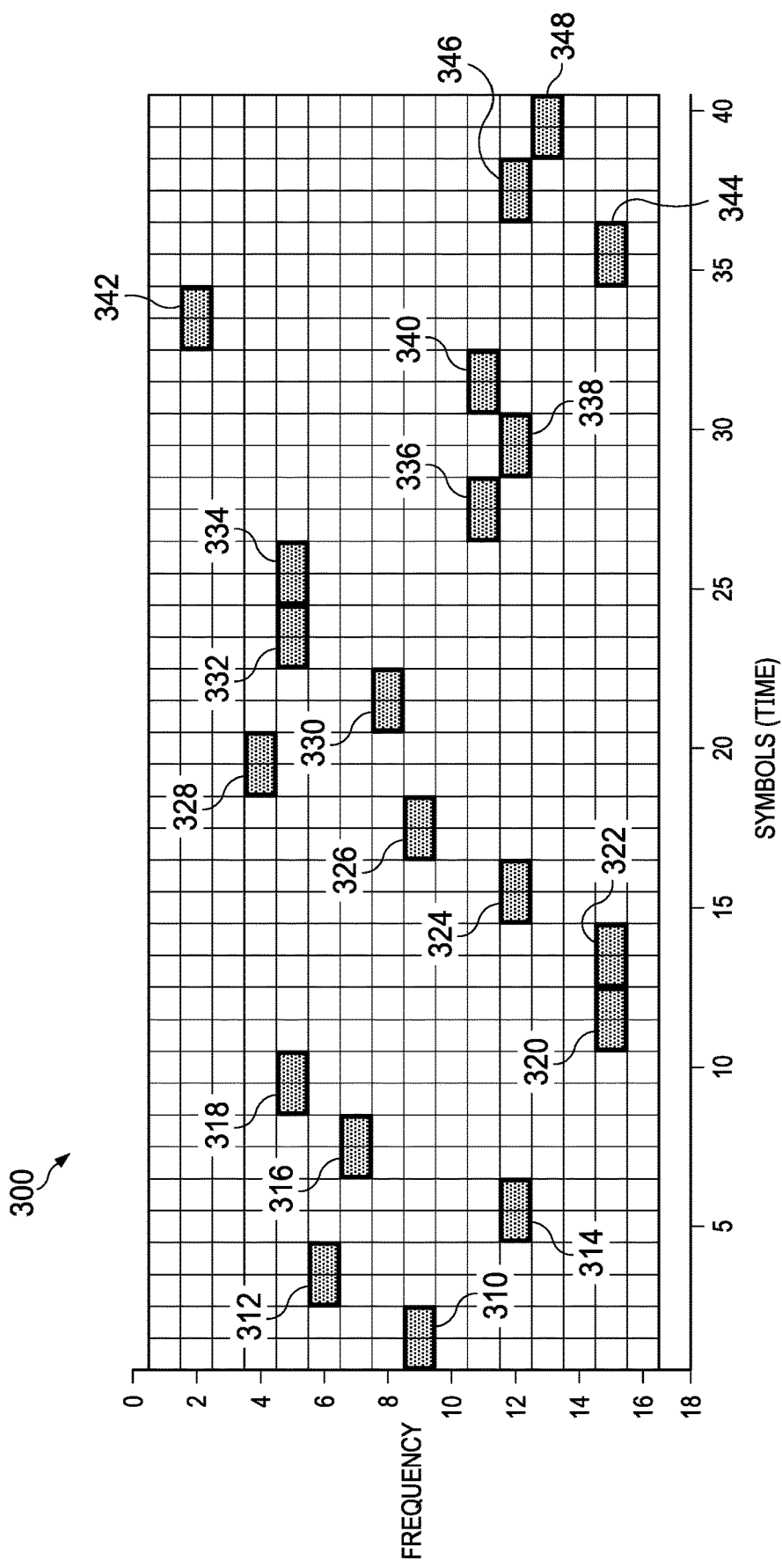
FIG. 3 shows a grid of forty symbols encoded across sixteen carrier frequencies according to some aspects of the present disclosure.

Specific examples are described below in detail with reference to the accompanying figures. It is understood that these examples are not intended to be limiting, and unless otherwise noted, no feature is required for any particular example. Moreover, the formation of a first feature over or on a second feature in the description that follows may include examples in which the first and second features are formed in direct contact and examples in which additional features are formed between the first and second features, such that the first and second features are not in direct contact.

In general, frequency-division multiplexing (FDM) transmitters encode information in multiple frequency bands and combine signals from the frequency bands for transmission. FDM systems have high throughput, as compared to some other communication systems. However, a transmitter implementing FDM may consume large amounts of power at peak conditions, resulting in a high peak-to-average-power ratio (PAPR).

A transmitter of this disclosure may be configured to encode information in only one frequency band at a time, which may result in a PAPR closer to one. As a consequence, a transmitter of this disclosure may be more resilient against interference and noise by using direct sequence spread spectrum (DSSS) and/or single carrier-frequency-division multiple access (SC-FDMA) to spread information across time and/or across multiple frequency bands. A lower PAPR and increased resiliency may be useful for long range transmissions. Of course, these advantages are merely examples, and no advantage is required for any particular embodiment.

Examples of frequency-division multiplexing are described with reference to the figures below. In that regard, FIG. 1 is a conceptual block diagram of a transmitter 100 according to some aspects of the present disclosure. In the example shown in FIG. 1, transmitter 100 includes processing circuitry 102, forward error correction circuit 110, interleaver circuit 120, DSSS circuit 130, bits to symbols circuit 140, single sub-carrier mapping circuit 150, inverse transform circuit 160, cyclic prefix circuit 170, and antenna 180.

In some examples, transmitter 100 may include more or fewer elements. For example, transmitter 100 may include a digital-to-analog converter, a mixer, a combiner circuit (e.g., a parallel to serial circuit), and/or a splitter circuit (e.g., a serial to parallel circuit). Additionally or alternatively, some of the components shown in FIG. 1 may be outside of transmitter 100 and/or outside of processing circuitry 102. For example, transmitter 100 may include an output node configured to couple to an external antenna.

Although shown as separate elements in FIG. 1, some or all of forward error correction circuit 110, interleaver circuit 120, DSSS circuit 130, bits to symbols circuit 140, single sub-carrier mapping circuit 150, inverse transform circuit 160, and cyclic prefix circuit 170 may be implemented as a block of hardware within processing circuitry 102. Additionally or alternatively, some or all of the elements shown in FIG. 1 may be implemented in instructions stored to non-transitory memory, where processing circuitry 102 may be configured to read the instructions from memory and execute the instructions.

Forward error correction circuit 110 may be configured to perform convolutional coding of an input bit stream before sending the bit stream to interleaver circuit 120. Examples of forward error correction include convolutional coding, channel coding, and polar coding. In some examples, forward error correction circuit 110 uses a concatenated code including a Reed-Solomon block code and an inner half-rate convolutional code. Additional example details of forward error correction can be found in the IEEE Standard for Low-Rate Wireless Networks, IEEE Std 802.15.4-2020, which is incorporated by reference in its entirety. Interleaver circuit 120 may be configured to interleave the bits received from forward error correction circuit 110 across time and/or across frequency. To increase the robustness of the encoded information, interleaver circuit 120 can separate the payload bits outputted by forward error correction circuit 110.

In general, there are two types of interference or noise experienced by transmitter 100: vertical and horizontal interference. In an example of vertical interference, transmitter 100 experiences a short burst of interference that impacts all of the frequencies used by transmitter 100. By separating and spreading the payload bits across time, interleaver circuit 120 can make the payload bits more robust against the short burst of interference. In an example of horizontal interference, transmitter 100 experiences narrowband interference that impacts some, but not all, of the frequency bands in which transmitter 100 operates. By separating and spreading the payload bits across time (and therefore across frequencies channels), interleaver circuit 120 can make the payload bits more robust against the narrowband interference.

The bit stream outputted by interleaver circuit 120 includes the payload bits to be communicated by transmitter 100 to a remote receiver. DSSS circuit 130 may be configured to generate a spread of chips based on each input bit received from interleaver circuit 120. In examples in which DSSS circuit 130 is configured to generate two, four, eight, twelve, or sixteen chips for each input bit received from interleaver circuit 120, the stream of chips outputted by DSSS circuit 130 will be longer than the input bit stream received by DSSS circuit 130 from interleaver circuit 120. As an alternative to a 1:X spreading technique, DSSS circuit 130 may use a spreading technique that converts two or more bits into a sequence of four or more chips (e.g., a 2:X, 4:X, or 8:X spreading technique). Other spread spectrum techniques may be used in addition to or as an alternative to DSSS. Additional example details of DSSS in a communication system can be found in commonly assigned U.S. Pat. No. 9,935,681, entitled "Preamble Sequence Detection of Direct Sequence Spread Spectrum (DSSS) Signals," issued on Apr. 3, 2018, and commonly assigned U.S. Pat. No. 9,831,909, entitled "DSSS Inverted Spreading for Smart Utility Networks," issued on Nov. 28, 2017, each of which is incorporated by reference in its entirety.

In some examples, the stream of chips outputted by DSSS circuit 130 may be more robust against interference because a receiver can identify a payload bit in a transmitted signal even if one of the chips associated with that payload bit is corrupted by interference. A short burst of interference may corrupt a chip, but the receiver can evaluate adjacent chips to identify the value of the payload bit.

Bits to symbols circuit 140 may be configured to convert each chip received from DSSS circuit 130 to a respective symbol. Each symbol may be represented as a complex number with a real value and an imaginary value. Each complex number may eventually be mapped onto a carrier signal as a phase shift, an amplitude change, and/or a change in frequency. Bits to symbols circuit 140 can use a modulation process such as quadrature amplitude modulation (QAM) (e.g., 16-QAM) or phase shift keying (PSK) (e.g., binary PSK or quadrature PSK). The ratio of chips representing payload bits to symbols may be one-to-one, one-to-two, two-to-one, four-to-one, or any other ratio. In examples in which processing circuitry 102 implements binary PSK, bits to symbols circuit 140 may be configured to convert each chip from DSSS circuit 130 to a respective symbol. Additional example details of PSK and QAM can be found in commonly assigned U.S. Pat. No. 9,001,948, entitled "Pulse Shaping in a Communication System," issued on Apr. 7, 2015, which is incorporated by reference in its entirety.

Single sub-carrier mapping circuit 150 may be configured to map each symbol to a single sub-carrier signal of inverse transform circuit 160. Single sub-carrier mapping circuit 150 may be configured to map each symbol to a single input of inverse transform circuit 160, setting all other inputs of inverse transform circuit 160 to zero. Thus, for each time slot, circuits 150 and 160 may map a single symbol to a single sub-carrier by at least modulating a sine or cosine wave or switching between sine or cosine waves. The total bandwidth of transmitter 100 may be divided into multiple frequency bands, and transmitter 100 may be configured to transmit on one of the frequency bands at a time. Processing circuitry 102 can reuse the same carrier for the second symbol of a pair so that differentially encoded symbols share the same sub-carrier.

Inverse transform circuit 160 may be configured to compute an inverse Fast Fourier Transform (FFT) on the symbols outputted by single sub-carrier mapping circuit 150. The output of inverse transform circuit 160 may include samples of the symbols. Cyclic prefix circuit 170 can repeat all or a portion of each symbol before and/or after that symbol. Cyclic prefix circuit 170 may be configured to add a guard interval between the transmission of adjacent symbols. The guard interval may reduce the intersymbol interference between adjacent symbols, which is an important consideration in multipath environments. Additional example details of cyclic prefixes and guard intervals can be found in the IEEE Standard for Low-Rate Wireless Networks, IEEE Std 802.15.4-2020, which is incorporated by reference in its entirety.

FIG. 2 shows four tables 210, 220, 230, and 240 having example conversions from bits to spreads of chips using DSSS according to some aspects of the present disclosure. Each of tables 210, 220, 230, and 240 shows conversions from an input bit of one or zero to a DSSS sequence, which is also referred to as a spread of chips. Tables 210, 220, 230, and 240 show the conversion of an input bit into a spread of two, four, eight, and twelve chips, respectively. As used herein, the "DSSS value" refers to the number of chips used to represent each payload bit. Thus, table 210 depicts a DSSS value of two, table 220 depicts a DSSS value of four, and so on. The DSSS value may be a predetermined value that is built into a communication device. Additionally or alternatively, a user may be able to set the DSSS value, such that the communication device will select a DSSS value on user input.

Tables 210, 220, 230, and 240 show implementations for converting a single bit value into two, four, eight, or twelve chips. A single bit value may be converted to other numbers of chips, such as sixteen chips, twenty chips, thirty-two chips, or sixty-four chips, to name a few. In some examples, a transmitter may be configured to convert multiple bits, rather than a single bit, into a sequence of chips. For example, two-to-eight DSSS may convert two bits into a sequence of eight chips. In this example, each set of two bits may have four possible values, where each of the four values is associated with at least one unique sequence of eight chips. This disclosure contemplates examples such as two-to-sixteen DSSS and four-to-sixteen DSSS for communication devices implementing DSSS.

Each input bit shown in tables 210, 220, 230, and 240 corresponds to a payload bit of information. By spreading each payload bit into the chips shown in tables 210, 220, 230, and 240, a transmitter can increase the redundancy and resiliency of the data being transmitted. For example, spreads of 0011 and 1100 in table 220 represent a payload bit having a logical value of one, and spreads of 0110 and 1001 represent a payload bit having a logical value of zero.

For every spread shown in tables 210, 220, 230, and 240, two consecutive matching or identical chips at the beginning of the spread (e.g., 11 or 00) represents a logical value of one for the payload bit. Likewise, two consecutive non-matching or different chips at the beginning of the spread (e.g., 10 or 01) represents a logical value of zero for the payload bit. For each symbol pair, a positive symbol followed by a positive symbol indicates a logical value of one, a positive symbol followed by a negative symbol indicates a logical value of zero, a negative symbol followed by a positive symbol indicates a logical value of zero, and a negative symbol followed by a negative symbol indicates a logical value of one. The DSSS patterns shown in tables 210, 220, 230, and 240 provide differential encoding for the payload bits. A receiver can identify the value of a payload bit by determining whether the first two chips or symbols in a sequence are identical or different. For DSSS values greater than two, the receiver can evaluate multiple pairs of symbols to determine the value of each payload bit.

To avoid multiple repetitions of the same sequence, a transmitter can toggle between even and odd spreads and use a different encoding for even and odd information. The transmitter can switch between even and odd spreads after each input bit or after a particular number of input bits. By switching between even and odd spreads, the transmitter can avoid repeatedly using identical spreads. As an example of toggling between even and odd spreads, a transmitter can generate a first even spread of chips representing a first input bit and then generate a second odd spread of chips representing the next input bit. If three consecutive input bits have a logical value of one, the transmitter can generate an even spread of 00 representing the first input bit, an odd spread of 11 representing the second input bit, and an even spread of 00 representing the third input bit. Therefore, even though the three consecutive input bits in this example have the same logical value, the logical values of the chips representing the first input bit are opposite of the logical values of the chips representing the second input bit. The logical values of the chips representing the first input bit are identical to logical values of the chips representing the third input bit.

Transmitting multiple chips or symbols for each payload bit improves robustness and redundancy. Transmitting a single chip or symbol for each payload bit can result in lost information if the receiver has low sensitivity and/or if the signal encounters interference. In contrast, transmitting multiple chips for each payload bit spreads each payload bit across time and possibly across frequencies. In examples in which one chip becomes corrupted, a receiver with low sensitivity may still be able extract the value of a payload bit by evaluating the remaining chips in the sequence that represents the payload bit.

FIG. 3 shows a grid 300 of forty symbols encoded across sixteen carrier frequencies according to some aspects of the present disclosure. FIG. 3 shows the symbols after being mapped to the carrier signals, and after applying an inverse transform. Thus, grid 300 corresponds to a possible output of inverse transform circuit 160 shown in FIG. 1. Pairs of symbols 310-348 are shown in grid 300 as two horizontally adjacent boxes. The horizontal axis in FIG. 3 represents the forty time slots for transmitting data. The vertical axis in FIG. 3 represents the sixteen frequency bands in which data can be encoded for transmission. Grid 300 includes sixteen frequency bands, but a transmitter of this disclosure may include a greater or smaller number of transmission channels.

A transmitter implementing grid 300 can use a single sub-carrier signal for each time slot. This technique will result in lower throughput than another transmitter that encodes data in all sixteen frequency bands during every time slot. Accordingly, the transmitter implementing a single sub-carrier signal for each time slot grid 300 will have lower PAPR and produce an RF signal that is easier for a receiver to demodulate.

According to grid 300, only one sub-carrier frequency is used for each time slot. A transmitter implementing grid 300 can select a new sub-carrier frequency after every two time slots, so that the symbols in each pair share the same frequency band. A transmitter can use FDM to divide up the total bandwidth into channels that can be selected by the transmitter for each pair of time slots. Additionally or alternatively, a transmitter of this disclosure may be configured to implement other forms of division multiplexing, such as time division multiplexing or code division multiplexing, for modulating RF signals.

Grid 300 shows a new channel assignment after every two time slots. For example, the transmitter assigns pair of symbols 310 to the ninth frequency band, pair of symbols 312 to the sixth frequency band, and so on. Each pair of symbols is assigned by the transmitter to a new, randomly selected frequency band in the examples shown in FIG. 3. Although not shown in FIG. 3, other implementations are possible, such as assigning three or more symbols to each channel, resulting in less frequent channel switching than the example shown in grid 300. In addition, the assignment of a new channel may be selected randomly, pseudo-randomly, quasi-randomly, or deterministically.

A receiver may be configured to determine the payload bit represented by each pair of symbols by comparing the two symbol values in each pair. In some examples, a logical value of one is represented by two identical symbols values, and a logical value of zero is represented by two non-identical symbol values. Thus, the receiver can compare the second symbol value in the pair to the previous symbol value to determine the value of the payload bit represented by that pair of symbols. The receiver can demodulate the RF signal using local information without any additional information, such that reducing the interference caused by frequency drift over time and multi-path environments.

For a DSSS value of two, the transmitter may be configured to convert each payload bit to a sequence of two chips and map each chip to a symbol. Therefore, each payload bit will be mapped to a single pair of symbols. For a DSSS value of two, each chip will occupy one distinct time slot, so that two time slots will represent a single payload bit. Thus, for a DSSS value of two, each payload bit will be mapped into two time slots such that pair 310 represents a first payload bit, pair 312 represents a second payload bit, and so on.

For DSSS values higher than two, each payload bit will be mapped to more than one pair of symbols. For example, at a DSSS value of four, each payload bit will be converted to four chips, and each chip will be mapped to a symbol. Thus, a payload bit will be represented by four symbols (e.g., across four time slots in grid 300) such that pairs 310 and 312 represent a first payload bit, pairs 314 and 316 represent a second payload bit, and so on. For a DSSS value of four, each chip will occupy one distinct time slot, so that four time slots will represent a single payload bit. For a DSSS value of eight, pairs 310, 312, 314, and 316 represent a first payload bit, pairs 318, 320, 322, and 324 represent a second payload bit, and so on. For a DSSS value of eight, there will be eight time slots representing one payload bit, making the communication system more robust against interference than communications having a DSSS value of one. A receiver will have eight chances to identify the value represented by the DSSS sequence, which increases the likelihood that the receiver correctly identifies the value of the payload bit.

A transmitter implementing the techniques of this disclosure may be configured to perform random channel assignment. For example, the transmitter may assign each pair of symbols to a carrier signal based on a random number generator. The example represented in grid 300 includes pair of symbols 312 encoded in a first carrier signal in the ninth frequency band of the sixteen bands in grid 300. Pair of symbols 314 is encoded in a second carrier signal in the sixth frequency band, pair of symbols 316 is encoded in a third carrier signal in the twelfth frequency band, pair of symbols 318 is encoded in a fourth carrier signal in the seventh frequency band, and pair of symbols 320 is encoded in a fifth carrier signal in the fifth frequency band.

Consecutive pairs of symbols will typically be assigned to different carrier signals. However, depending on random number generation, some consecutive pairs of symbols may be assigned to the same carrier signal, so that four or more consecutive symbols are assigned to the same carrier signal. As two examples, pairs of symbols 320 and 322 are encoded in a carrier signal in the fifteenth frequency band, and pairs of symbols 332 and 334 are encoded in a carrier signal in the fifth frequency band. Additionally, because of the random channel assignment, five of the sixteen frequency bands shown in grid 300 are not used during the time slots depicted in FIG. 3.

Figure 4:
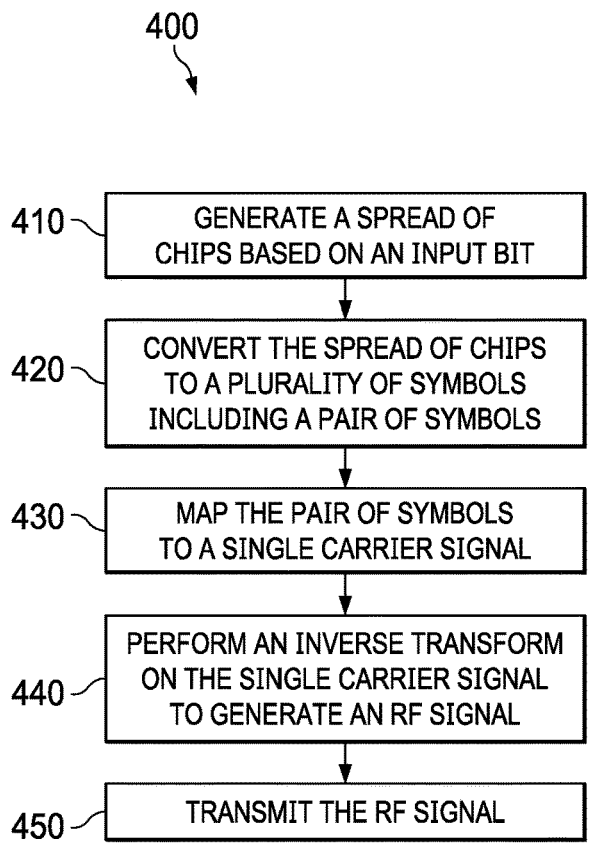
FIG. 4 is a flow diagram of a method for modulating an input bit onto a radio-frequency (RF) signal according to some aspects of the present disclosure.

FIG. 4 is a flow diagram of a method for modulating an input bit onto an RF signal according to some aspects of the present disclosure. Some processes of the method 400 may be performed in orders other than described, and many processes may be performed concurrently in parallel. Furthermore, processes of the method 400 may be omitted or substituted in some examples of the present disclosure. The method 400 is described with reference to transmitter 100 shown in FIG. 1, although other components may exemplify similar techniques.

Referring to block 410, DSSS circuit 130 generates a spread of chips based on an input bit. Each spread may include two or more chips that represent a single payload bit received by DSSS circuit 130 from interleaver circuit 120. The chips may spread the information encoded in the payload bit across time and/or frequency to protect from interference. Referring to block 420, bits to symbols circuit 140 converts the spread of chips to a plurality of symbols including a pair of symbols. Each symbol may be represented as a complex number with a real value and an imaginary value. Each complex number may be mapped onto a carrier signal as a phase shift, a frequency modulation, and/or an amplitude modulation based on the value of the complex number. In examples in which processing circuitry 102 uses a DSSS value of two, the plurality of symbols will include just one pair of symbols. However, for higher DSSS numbers, the plurality of symbols will include multiple pairs of symbols, which can result in greater robustness against narrowband interference.

Referring to block 430, single sub-carrier mapping circuit 150 maps the pair of symbols to a single carrier signal. Processing circuitry 102 may be configured to randomly assign frequency channels to each pair of symbols. Processing circuitry 102 can map each symbol onto the assigned carrier signal by modulating the phase, frequency, and/or amplitude of a carrier signal using PSK, QAM, and/or any other suitable modulation technique. Referring to block 440, inverse transform circuit 160 performs an inverse FFT on the output of single sub-carrier mapping circuit 150 to generate an RF signal. Processing circuitry 102 may be configured to insert a cyclic prefix and/or guard interval in between adjacent symbols. Referring to block 450, transmitter 100 transmits the RF signal via antenna 180.

FIG. 5 is a conceptual block diagram of a receiver 500 according to some aspects of the present disclosure. In the example shown in FIG. 5, receiver 500 includes processing circuitry 502, de-interleaver circuit 520, symbols to bits circuit 540, extraction from carrier circuit 550, transform circuit 560, and antenna 580. In some examples, receiver 500 may include more or fewer elements. For example, receiver 500 may include an analog-to-digital converter, a mixer, reverse error correction, cyclic prefix removal, a combiner circuit, and/or a splitter circuit. Additionally or alternatively, some of the components shown in FIG. 5 may be outside of receiver 500 and/or outside of processing circuitry 502. For example, receiver 500 may include an output node configured to couple to an external antenna.

Although shown as separate elements in FIG. 5, some or all of de-interleaver circuit 520, symbols to bits circuit 540, extraction from carrier circuit 550, and transform circuit 560 may be implemented as a block of hardware within processing circuitry 502. Additionally or alternatively, some or all of the elements shown in FIG. 5 may be implemented in instructions stored to non-transitory memory, where processing circuitry 502 may be configured to read the instructions from memory and execute the instructions.

Transform circuit 560 may be configured to compute an FFT on the RF signal received by antenna 580. The output of transform circuit 560 may include samples of the RF signal. Extraction from carrier circuit 550 may be configured to extract one or more symbols from the output of transform circuit 560. Extraction from carrier circuit 550 may be configured to determine the carrier frequency and output symbols based on the phase, frequency, and/or amplitude modulation that receiver 500 detects on the carrier signal.

Symbols to bits circuit 540 may be configured to convert each pair of symbols to a value of a respective payload bit, for example, by comparing two consecutive symbols outputted by extraction from carrier circuit 550. Symbols to bits circuit 540 can use a demodulation process such as PSK and/or QAM. The number of symbols corresponding to each payload bit depends on the DSSS ratio used by the transmitter. De-interleaver circuit 520 may be configured to de-interleave the bits received from symbols to bits circuit 540.

Figure 6:
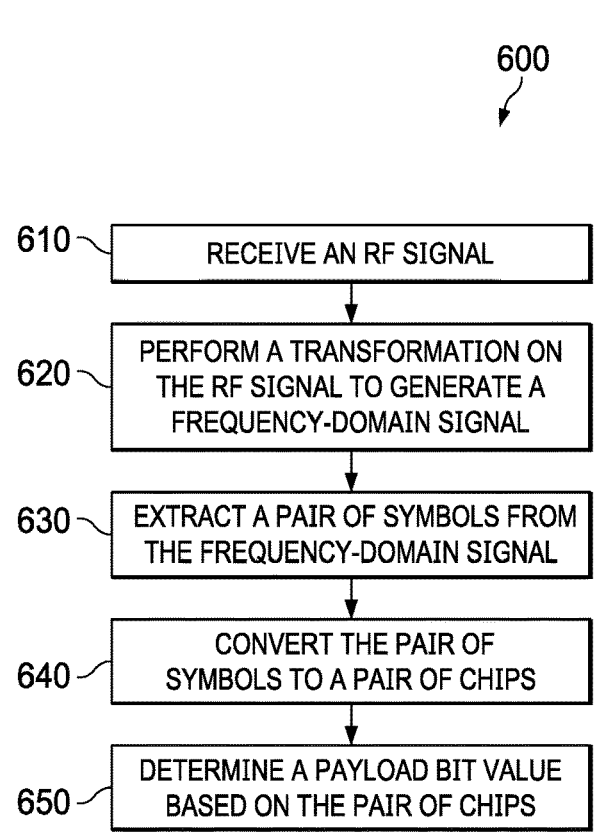
FIG. 6 is a flow diagram of a method for demodulating a RF signal according to some aspects of the present disclosure.

FIG. 6 is a flow diagram of a method for demodulating a RF signal according to some aspects of the present disclosure. Some processes of the method 600 may be performed in orders other than described, and many processes may be performed concurrently in parallel. Furthermore, processes of the method 600 may be omitted or substituted in some examples of the present disclosure. The method 600 is described with reference to transmitter 500 shown in FIG. 5, although other components may exemplify similar techniques.

Referring to block 610, antenna 580 receives an RF signal. The RF signal may include information mapped onto a single carrier signal for each time slot. Referring to block 620, transform circuit 560 performs a transformation on the RF signal to generate samples of the RF signal. The samples include information about the symbols mapped on the carrier signal in each time slot. Referring to block 630, extraction from carrier circuit 550 extracts a pair of symbols from the samples.

Referring to block 640, symbols to bits circuit 540 converts the pair of symbols to a pair of chips. Processing circuitry 502 may be configured to use a demodulation process such as PSK and/or QAM to convert the symbols to chips. The symbols may be represented as a complex number with a real value and an imaginary value. Each complex number may be mapped onto a carrier signal mapped onto each carrier signal as an amplitude, phase, or frequency change. Referring to block 650, symbols to bits circuit 540 determines a payload bit value based on the pair of chips. The number of chips that represents each payload bit depends on the DSSS that is implemented by the transmitter.

In general, OFDM communication has the ability to convey more information per Hertz than many other communication types. Moreover, OFDM communication systems can combat multi-path conditions with the longer symbol durations and the addition of cyclic prefixes. However, OFDM modulation generally suffers from a significant PAPR in the range of six to twelve decibels. The PAPR of an OFDM transmitter depends on the number of sub-carriers used by the OFDM transmitter. A high PAPR means higher power consumption for the same level of transmission power, which is especially important for battery-powered devices and vehicle-based devices. As such, OFDM transmitters typically are not employed for communication across longer ranges.

This disclosure describes a transmitter that employs a single sub-carrier for each time slot, similar to SC-FDMA. Thus, the transmitter may have a very low PAPR that approaches the theoretical limit of zero decibels. The transmitter may be designed with fewer and/or smaller power amplifiers because of the lower PAPR, as compared to an OFDM transmitter with the same average power consumption. In addition, the transmitter may be configured to use DSSS to create redundancy for each payload bit. This redundancy may be especially useful in conditions with low signal-to-noise ratios (e.g., more noise energy or lower signal energy). By combining a PAPR of zero decibels and DSSS spreading, the overall link budget of a communication system can be extended by as much as twenty decibels.

This disclosure also describes encoding binary information into symbols, on a pair-by-pair basis. A transmitter may be configured to spread each bit into multiple chips, convert each chip into a symbol, and map the two consecutive symbols onto a single sub-carrier signal. The transmitter can use the differential encoding of DSSS to differentially map incoming symbols on the same sub-carrier signal, such that the symbols can effectively share a common phase reference. In contrast, a transmitter that employs multiple simultaneous sub-carrier signals may have difficulty achieving a common phase reference without precise channel equalization.

In some examples, a transmitter of this disclosure may support long range communication because of the low PAPR and resiliency. Additionally, the transmitter may have a six-decibel bandwidth greater than five hundred kilohertz in compliance with Federal Communications Commission regulation 47 C.F.R. § 15.247 (a)(2).

The following numbered aspects demonstrate one or more aspects of the disclosure.

Aspect 1. A method includes generating, by processing circuitry, a spread of chips representing an input bit. In addition, the method includes converting, by the processing circuitry, the spread of chips to a plurality of symbols including a pair of symbols. The method also includes mapping, by the processing circuitry, the pair of symbols to a single carrier signal and generating, by the processing circuitry, a RF signal based on the single carrier signal. The method further includes transmitting, by the processing circuitry via an antenna, the RF signal.

Aspect 2. The method of the preceding aspect, where generating the spread of chips includes generating two consecutive chips representing the input bit.

Aspect 3. The method of the preceding aspect, where matching values for the two consecutive chips represents a first value of the input bit.

Aspect 4. The method of the two preceding aspects or any combination thereof, where non-matching values for the two consecutive chips represents a second value of the input bit different from the first value.

Aspect 5. The method of the preceding aspects or any combination thereof, where the input bit is a first input bit, the spread of chips is a first spread of chips, and the method further includes generating a second spread of chips representing a second input bit after generating the first spread of chips.

Aspect 6. The method of the preceding aspect, where a logical value of the second input bit is identical to a logical value of the first input bit, and logical values of the second spread of chips are opposite of logical values of the first spread of chips.

Aspect 7. The method of the two preceding aspects or any combination thereof, further including generating a third spread of chips representing a third input bit after generating the second spread of chips.

Aspect 8. The method of the preceding aspect, where a logical value of the third input bit is identical to a logical value of the second input bit, logical values of the third spread of chips are opposite of logical values of the second spread of chips, and logical values of the third spread of chips are identical to logical values of the first spread of chips.

Aspect 9. The method of the preceding aspects or any combination thereof, where the pair of symbols is a first pair of symbols, the single carrier signal is a first carrier signal, the plurality of symbols further includes a second pair of symbols, and the method further including mapping the second pair of symbols to a second carrier signal different from the first carrier signal.

Aspect 10. The method of the preceding aspect, where the first pair of symbols encodes a value of the input bit, and the second pair of symbols encodes the value of the input bit.

Aspect 11. The method of the two preceding aspects or any combination thereof, where transmitting the RF signal includes transmitting a first RF signal at a first time, and the method further includes generating a second RF signal based on the second carrier signal including the second pair of symbols.

Aspect 12. The method of the preceding aspect, further including transmitting the second RF signal at a second time after the first time.

Aspect 13. The method of the four preceding aspects or any combination thereof, where a first frequency band of the first carrier signal is orthogonal to a second frequency band of the second carrier signal.

Aspect 14. The method of the preceding aspects or any combination thereof, where the plurality of symbols includes a first pair of symbols representing the input bit and a second pair of symbols representing the input bit.

Aspect 15. The method of the preceding aspects or any combination thereof, where the plurality of symbols includes a first pair of symbols representing the input bit and a second pair of symbols representing the input bit, the single carrier signal is a first carrier signal, the second pair of symbols is different from the first pair of symbols, and the method further includes selecting a first channel centered on a first frequency. The method also includes mapping the first pair of symbols to the first carrier signal in the first channel, generating a first RF signal based on the first carrier signal, and transmitting the first RF signal at a first time. The method further includes selecting a second channel centered on a second frequency different from the first frequency, mapping the second pair of symbols to a second carrier signal in the second channel, generating a second RF signal based on the second carrier signal, and transmitting the second RF signal at a second time after the first time.

Aspect 16. The method of the preceding aspects or any combination thereof, where converting the spread of chips into the plurality of symbols includes performing binary phase shift keying on the spread of chips.

Aspect 17. The method of the preceding aspects or any combination thereof, further including adding a cyclic prefix and a guard interval between the pair of symbols.

Aspect 18. The method of the preceding aspects or any combination thereof, where generating the RF signal includes performing an inverse transform on the single carrier signal including the mapped pair of symbols to generate the RF signal.

Aspect 19. A computing system includes processing circuitry and a non-transitory computer-readable medium coupled to the processing circuitry and storing instructions that, when executed by the processing circuitry, cause the processing circuitry to generate a spread of chips representing an input bit. In addition, the non-transitory computer-readable medium stores instructions that cause the processing circuitry to convert the spread of chips to a plurality of symbols including a pair of symbols and map the pair of symbols to a single carrier signal. The non-transitory computer-readable medium also stores instructions that cause the processing circuitry to generate a radio-frequency (RF) signal based on the single carrier signal including the mapped pair of symbols and transmit the RF signal via an antenna.

Aspect 20. The computing system of the preceding aspect, where the non-transitory computer-readable medium stores instructions that cause the processing circuitry to perform the method of aspects 1-18 or any combination thereof.

Aspect 21. A system includes an antenna and processing circuitry configured to generate a spread of chips representing an input bit. In addition, the processing circuitry is configured to convert the spread of chips to a plurality of symbols including a pair of symbols and map the pair of symbols to a single carrier signal. The processing circuitry is also configured to generate a radio-frequency (RF) signal based on the single carrier signal including the mapped pair of symbols. The processing circuitry is further configured to transmit the RF signal via the antenna.

Aspect 22. The computing system of the preceding aspect, where the processing circuitry is configured to perform the method of aspects 1-18 or any combination thereof.

Aspect 23. A system including means for performing the method of aspects 1-18 or any combination thereof.

This disclosure has attributed functionality to transmitter 100, processing circuitry 102 and 502, circuits 110, 120, 130, 140, 150, 160, 170, 520, 540, 550, and 560, and antennas 180 and 580. Transmitter 100, processing circuitry 102 and 502, circuits 110, 120, 130, 140, 150, 160, 170, 520, 540, 550, and 560, and antennas 180 and 580 may include one or more processors. Transmitter 100, processing circuitry 102 and 502, circuits 110, 120, 130, 140, 150, 160, 170, 520, 540, 550, and 560, and antennas 180 and 580 may include any combination of integrated circuitry, discrete logic circuitry, analog circuitry, such as one or more microprocessors, microcontrollers, DSPs, application specific integrated circuits (ASICs), central processing units (CPUs), graphics processing units (GPUs), FPGAs, and/or any other processing resources.

In some examples, transmitter 100, processing circuitry 102 and 502, circuits 110, 120, 130, 140, 150, 160, 170, 520, 540, 550, and 560, and antennas 180 and 580 may include multiple components, such as any combination of the processing resources listed above, as well as other discrete or integrated logic circuitry, and/or analog circuitry.

The techniques described in this disclosure may also be embodied or encoded in an article of manufacture including a non-transitory computer-readable storage medium. Example non-transitory computer-readable storage media may include random access memory (RAM), read-only memory (ROM), programmable ROM, erasable programmable ROM, electronically erasable programmable ROM, flash memory, a solid-state drive, a hard disk, magnetic media, optical media, or any other computer readable storage devices or tangible computer readable media. The term "non-transitory" may indicate that the storage medium is not embodied in a carrier wave or a propagated signal. In certain examples, a non-transitory storage medium may store data that can, over time, change (e.g., in RAM or cache).

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

It is understood that the present disclosure provides a number of exemplary embodiments and that modifications are possible to these embodiments. Such modifications are expressly within the scope of this disclosure. Furthermore, application of these teachings to other environments, applications, and/or purposes is consistent with and contemplated by the present disclosure.

What is claimed is:

1. A method comprising:
    generating, by processing circuitry, a spread of chips representing an input bit, wherein generating the spread of chips comprises generating two consecutive chips representing the input bit, wherein matching values for the two consecutive chips represents a first value of the input bit, and wherein non-matching values for the two consecutive chips represents a second value of the input bit different from the first value;
    converting, by the processing circuitry, the spread of chips to a plurality of symbols comprising a pair of symbols;
    mapping, by the processing circuitry, the pair of symbols to a single carrier signal;
    generating, by the processing circuitry, a radio-frequency (RF) signal based on the single carrier signal; and
    transmitting, by the processing circuitry via an antenna, the RF signal.

2. The method of claim 1,
    wherein the pair of symbols is a first pair of symbols,
    wherein the single carrier signal is a first carrier signal, and
    wherein the plurality of symbols further comprises a second pair of symbols,
    the method further comprising mapping the second pair of symbols to a second carrier signal different from the first carrier signal.

3. The method of claim 2,
    wherein the first pair of symbols encodes a value of the input bit, and
    wherein the second pair of symbols encodes the value of the input bit.

4. The method of claim 3, wherein transmitting the RF signal comprises transmitting the RF signal at a first time using a first channel centered on a first frequency, the method further comprising:
    generating a second RF signal based on the second carrier signal; and
    transmitting the RF signal at a second time using a second channel centered on a second frequency that is different from the first frequency.

5. The method of claim 1, wherein converting the spread of chips into the plurality of symbols comprises performing binary phase shift keying on the spread of chips.

6. The method of claim 1, wherein the plurality of symbols comprises orthogonal frequency-division multiplexing (OFDM) symbols.

7. The method of claim 1, further comprising adding a cyclic prefix and a guard interval between the pair of symbols.

8. A method comprising:
    generating, by processing circuitry, a first spread of chips representing a first input bit;
    converting, by the processing circuitry, the first spread of chips to a plurality of symbols comprising a pair of symbols;
    mapping, by the processing circuitry, the pair of symbols to a single carrier signal;
    generating, by the processing circuitry, a radio-frequency (RF) signal based on the single carrier signal;
    transmitting, by the processing circuitry via an antenna, the RF signal; and
    generating a second spread of chips representing a second input bit after generating the first spread of chips, wherein a logical value of the second input bit is identical to a logical value of the first input bit, and wherein logical values of the second spread of chips are opposite of logical values of the first spread of chips.

9. The method of claim 8, further comprising generating a third spread of chips representing a third input bit after generating the second spread of chips,
    wherein a logical value of the third input bit is identical to a logical value of the second input bit,
    wherein logical values of the third spread of chips are opposite of logical values of the second spread of chips, and
    wherein logical values of the third spread of chips are identical to logical values of the first spread of chips.

10. A method comprising:
    generating, by processing circuitry, a spread of chips representing an input bit;
    converting, by the processing circuitry, the spread of chips to a plurality of symbols comprising a first pair of symbols and a second pair of symbols;
    mapping, by the processing circuitry, the first pair of symbols to a first carrier signal;
    mapping the second pair of symbols to a second carrier signal different from the first carrier signal;
    generating, by the processing circuitry, a first radio-frequency (RF) signal based on the first and second carrier signals;
    transmitting, by the processing circuitry via an antenna, the first RF signal the first RF signal at a first time;
    generating a second RF signal based on the second carrier signal including the second pair of symbols; and
    transmitting the second RF signal at a second time after the first time.

11. A method comprising:
    generating, by processing circuitry, a spread of chips representing an input bit;
    converting, by the processing circuitry, the spread of chips to a plurality of symbols comprising a first pair of symbols and a second pair of symbols;
    mapping, by the processing circuitry, the first pair of symbols to a first carrier signal;
    mapping the second pair of symbols to a second carrier signal different from the first carrier signal;
    generating, by the processing circuitry, a first radio-frequency (RF) signal based on the first and second carrier signals; and
    transmitting, by the processing circuitry via an antenna, the first RF signal, wherein a first frequency band of the first carrier signal is orthogonal to a second frequency band of the second carrier signal.

12. A method comprising:
    generating, by processing circuitry, a spread of chips representing an input bit;
    converting, by the processing circuitry, the spread of chips to a plurality of symbols comprising a first pair of symbols representing the input bit and a second pair of symbols representing the input bit, wherein the second pair of symbols is different from the first pair of symbols;
selecting a first channel centered on a first frequency;
mapping the first pair of symbols to a first carrier signal in the first channel;
generating a first radio-frequency (RF) signal based on the first carrier signal;
transmitting the first RF signal at a first time;
selecting a second channel centered on a second frequency different from the first frequency;
mapping the second pair of symbols to a second carrier signal in the second channel;
generating a second RF signal based on the second carrier signal; and
transmitting the second RF signal at a second time after the first time.

13. A method comprising:
generating, by processing circuitry, a spread of chips representing an input bit, wherein generating the spread of chips comprises generating two consecutive chips representing the input bit, wherein matching values for the two consecutive chips represents a first value of the input bit, and wherein non-matching values for the two consecutive chips represents a second value of the input bit different from the first value;
converting, by the processing circuitry, the spread of chips to a plurality of symbols comprising a pair of symbols;
adding a cyclic prefix and a guard interval between the pair of symbols;
mapping, by the processing circuitry, the pair of symbols to a single carrier signal;
performing, by the processing circuitry, an inverse transform on the single carrier signal including the mapped pair of symbols to generate a radio-frequency (RF) signal; and
transmitting, by the processing circuitry via an antenna, the RF signal.

14. A computing system comprising:
processing circuitry; and
a non-transitory computer-readable medium coupled to the processing circuitry and storing instructions that, when executed by the processing circuitry, cause the processing circuitry to:
generate a spread of chips representing an input bit, wherein the instructions to generate the spread of chips comprise instructions to generate two consecutive chips representing the input bit, wherein matching values for the two consecutive chips represents a first value of the input bit, and wherein non-matching values for the two consecutive chips represents a second value of the input bit different from the first value;
convert the spread of chips to a plurality of symbols comprising a pair of symbols;
map the pair of symbols to a single carrier signal;
generate a radio-frequency (RF) signal based on the single carrier signal including the mapped pair of symbols; and
transmit the RF signal via an antenna.

15. The computing system of claim 14,
wherein the pair of symbols is a first pair of symbols,
wherein the single carrier signal is a first carrier signal,
wherein the plurality of symbols further comprises a second pair of symbols, and
wherein the non-transitory computer-readable medium further stores instructions that cause the processing circuitry to map the second pair of symbols to a second carrier signal different from the first carrier signal.

16. The computing system of claim 15,
wherein the first pair of symbols encodes a value of the input bit, and
wherein the second pair of symbols encodes the value of the input bit.

17. The computing system of claim 14,
wherein the plurality of symbols includes a first pair of symbols representing the input bit and a second pair of symbols representing the input bit,
wherein the second pair of symbols is different from the first pair of symbols, and
wherein the non-transitory computer-readable medium further stores instructions that cause the processing circuitry to:
select a first channel centered on a first frequency;
map the first pair of symbols to a first carrier signal in the first channel;
generate a first RF signal based on the first carrier signal;
transmit the first RF signal at a first time;
select a second channel centered on a second frequency different from the first frequency;
map the second pair of symbols to a second carrier signal in the second channel;
generate a second RF signal based on the second carrier signal; and
transmit the second RF signal at a second time after the first time.

18. A computing system comprising:
processing circuitry; and
a non-transitory computer-readable medium coupled to the processing circuitry and storing instructions that, when executed by the processing circuitry, cause the processing circuitry to:
generate a first spread of chips representing a first input bit;
generate a second spread of chips representing a second input bit after generating the first spread of chips, wherein a logical value of the second input bit is identical to a logical value of the first input bit, and wherein logical values of the second spread of chips are opposite of logical values of the first spread of chips;
convert the first spread of chips to a plurality of symbols comprising a pair of symbols;
map the pair of symbols to a single carrier signal;
generate a radio-frequency (RF) signal based on the single carrier signal including the mapped pair of symbols; and
transmit the RF signal via an antenna.

19. A computing system comprising:
processing circuitry; and
a non-transitory computer-readable medium coupled to the processing circuitry and storing instructions that, when executed by the processing circuitry, cause the processing circuitry to:
generate a spread of chips representing an input bit;
convert the spread of chips to a plurality of symbols comprising a first pair of symbols and a second pair of symbols;
map the first pair of symbols to a first carrier signal;
map the second pair of symbols to a second carrier signal different from the first carrier signal generate a first radio-frequency (RF) signal based on the first carrier signal including the mapped pair of symbols;
generate a second RF signal based on the second carrier signal;
transmit the first RF signal via an antenna at a first time; and
transmit the second RF signal at a second time after the first time.

20. A system comprising:
an antenna; and
processing circuitry configured to:
  generate a spread of chips representing an input bit, wherein generating the spread of chips comprises generating two consecutive chips representing the input bit, wherein matching values for the two consecutive chips represents a first value of the input bit, and wherein non-matching values for the two consecutive chips represents a second value of the input bit different from the first value;
  convert the spread of chips to a plurality of symbols comprising a pair of symbols;
  map the pair of symbols to a single carrier signal;
  generate a radio-frequency (RF) signal based on the single carrier signal including the mapped pair of symbols; and
  transmit the RF signal via the antenna.

* * * * *